United States Patent [19]

Seifert et al.

[11] 4,426,146
[45] Jan. 17, 1984

[54] FOCAL-PLANE LEAF SHUTTER

[75] Inventors: Rolf Seifert; Hans Zimmet; Herbert Welzel; Lothar Reschke, all of Dresden, German Democratic Rep.

[73] Assignee: VEB Pentacon Dresden Kamera und Kinowerke, Dresden, German Democratic Rep.

[21] Appl. No.: 346,835

[22] Filed: Feb. 8, 1982

[30] Foreign Application Priority Data

Mar. 11, 1981 [DD] German Democratic Rep. ... 228187

[51] Int. Cl.³ ............................. G03B 9/36; G03B 9/18
[52] U.S. Cl. ....................................... 354/246; 354/249
[58] Field of Search ................ 354/245, 246, 249, 250

[56] References Cited

U.S. PATENT DOCUMENTS 3,842,429 10/1974 Kitai et al. ........................... 354/246
3,854,144 12/1974 Onda et al. .......................... 354/246
4,231,650 11/1980 Saito et al. .......................... 354/246

Primary Examiner—A. A. Mathews
Attorney, Agent, or Firm—Dowell & Dowell

[57] ABSTRACT

A focal-plane leaf shutter for photographic cameras, comprises an opening group of leaves and a closing group of leaves, each group having a main leaf which forms a parallelogram linkage with a pair of carrier levers, and secondary leaves. The main leaves serve to define an exposure aperture. The carrier levers are mounted by means of stationary pivot journals on a plate at one short side of the exposure aperture and the main leaves are pivotally connected by means of bearing journals to the free ends of the carrier levers. The secondary leaves are connected with the carrier levers at intervals between the pivot journals and the bearing journals. The two innermost carrier levers forming parallelogram linkages with the main leaves are mounted on a common pivot journal.

3 Claims, 1 Drawing Figure

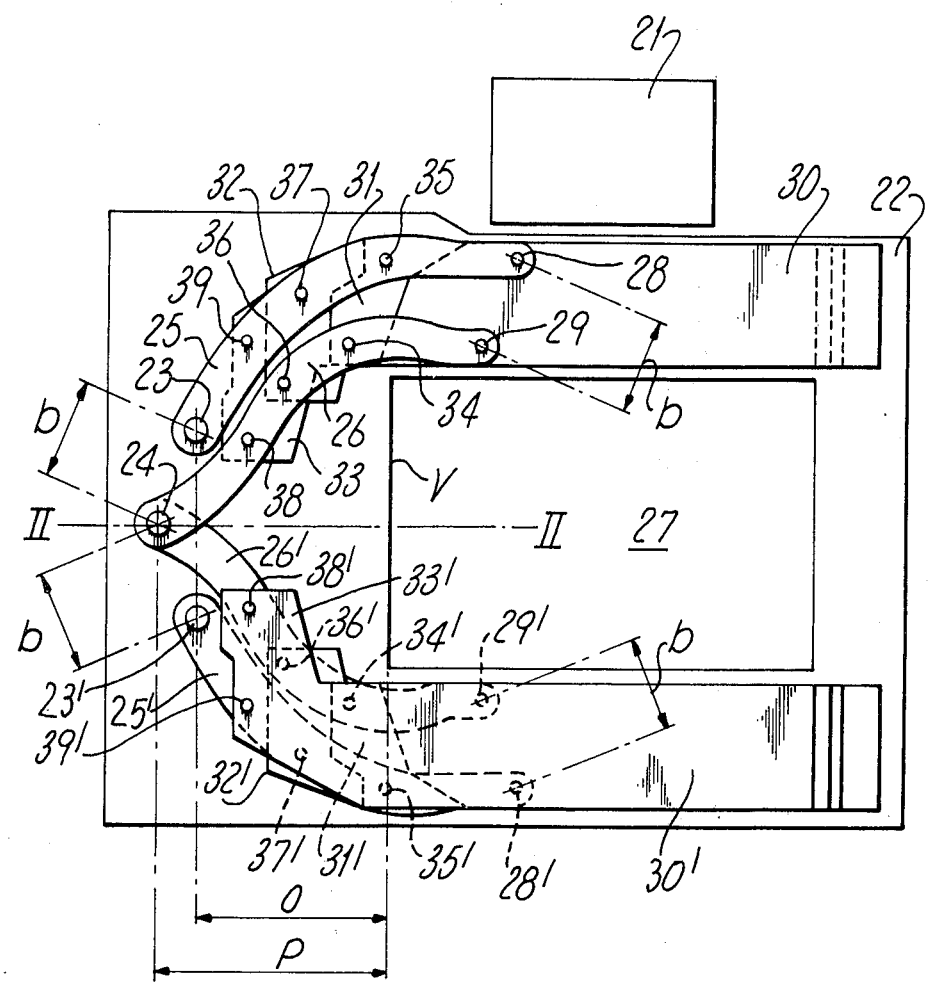

FOCAL-PLANE LEAF SHUTTER

BACKGROUND OF THE INVENTION

The invention relates to a focal-plane leaf shutter for photographic cameras, having an opening group of leaves and a closing group of leaves, the slot-forming main leaves of which each form a parallelogram linkage with a pair of carrier levers, the carrier levers being mounted by means of positionally fast pivot journals on a shutter plate along one short side of the exposure aperture and the main leaves being rotatably secured by means of bearing journals on the free ends of the carrier levers, while the secondary leaves are rotatably connected with the carrier levers at intervals between the pivot journals and the bearing journals.

STATEMENT OF PRIOR ART

Focal-plane shutters of this kind possess the advantage that a group of at least three narrow leaves can be articulatedly connected in each case with the carrier leaves arranged in pairs, so that the leaf groups, which can be closed up telescopically outside the picture window when it is opened, occupy little space. Admittedly the distance of the carrier levers from one another must not fall short of a certain minimum dimension if the parallelism of the movement of the shutter leaves is to be guaranteed. In known leaf arrangements each carrier lever is mounted on the shutter plate by a separate pivot journal.

OBJECT OF THE INVENTION

For the purpose of simplified design of the shutter mechanism it is an object of the invention to produce a new arrangement of the parallelogram linkage formed from carrier levers and leaves.

SUMMARY OF THE INVENTION

According to the invention there is provided a focal plane leaf shutter for photographic cameras comprising a support plate, first groups of shutter opening leaves having a main leaf and secondary leaves, a second group of shutter closing leaves having a main leaf and secondary leaves, the main leaves serving to form between them an exposure aperture during a part of the shutter exposure movement, a first pair of carrier levers movable in a plane parallel to the plane of the shutter pivotally mounted on said support plate and pivotally connected to the main leaf of said opening leaves to form therewith a parallelogram linkage, a second pair of carrier levers also movable in a plane parallel to the plane of the shutter pivotally mounted on said support plate and pivotally connected to the main leaf of said closing leaves to form therewith a parallelogram linkage, the adjacent carrier levers of the two groups being pivoted on a common axis at the support plate, and pivot means for connecting the secondary leaves of each group to the respective carrier levers at positions intermediate their pivotal connections.

According to a preferred embodiment wherein the exposure aperture has two short sides and two longer sides, the outer carrier levers are arranged offset in relation to the inner carrier levers, in that the pivot journals of the outer carrier levers are at a shorter distance from the short side of the exposure aperture than are the pivot journals of the inner carrier levers, which are arranged at a greater distance from the short side of the exposure aperture. As a result of this offsetting the bearing journals of the slot-forming main leaves can be arranged in the zone beneath the viewfinder, because especially the minimum distance of the bearing journals from one another, extending obliquely of the slot-forming edge of the main leaf, no longer requires a widening of the main leaves, so that the pivot journals of the carrier levers can be brought closer to the short side of the exposure aperture or the pivot angle of the carrier levers can be diminished. Expediently, the two leaf groups, consisting each of a slot-forming main leaf and several covering secondary leaves, are arranged together with their carrier levers in rotational symmetry about an axis which extends perpendicularly of the short side of the exposure aperture approximately through the middle of the exposure aperture.

BRIEF DESCRIPTION OF THE DRAWING

The invention is explained by reference to an illustrated and described example of embodiment. The accompanying drawing shows an arrangement with common mounting of the inner carrier levers during an exposure operation.

DESCRIPTION OF PREFERRED EMBODIMENT

The carrier levers 25 and 26 are rotatably secured by means of the positionally fast pivot journals 23 and 24 on a shutter plate 22 arranged beneath the viewfinder 21 in a camera housing. The pivot journals 23 and 24 are arranged at the distance b from one another and at the distances o and p from the short side v of the exposure aperture 27 situated in the shutter plate 22. The slot-forming main leaf 30 is articulatedly connected with the free ends of the carrier levers 25 and 26 by the bearing journals 28 and 29. The bearing journals 28 and 29 are at the same distance b from one another as the pivot journals 23 and 24 and together with these form a parallelogram linkage. Due to the unequal distances o and p the distance b extends obliquely of the slot-forming edge of the main leaf 30, so that the distance b is made great in relation to the narrow main leaf 30. Between the pivot journals 23 and 24 and the bearing journals 28 and 29 the secondary leaves 31, 32 and 33 are articulatedly connected with the carrier levers 25 and 26 through the secondary journals 34 to 39. The main leaf 30 and the secondary leaves 31, 32 and 33 form the upper leaf group. In rotational symmetry to the axis II—II, a further pair of carrier levers 25' and 26' is mounted on the pivot journals 23' and the common pivot journal 24. Again a slot-forming main leaf 30' and covering secondary leaves 31', 32' and 33' are articulatedly connected with the carrier levers 25' and 26'. The main leaf 30' and the secondary leaves 31', 32' and 33' form the lower leaf group.

The manner of operation of the arrangement is as follows:

Before the commencement of an exposure operation, that is to say when the shutter mechanism is cocked, the upper leaf group is situated in the position as illustrated between the viewfinder 21 and the exposure aperture 27, while the lower leaf group is covering the exposure aperture 27. After the release of an exposure operation firstly the lower leaf group is moved with the carrier levers 25' and 26' into the open position as illustrated beneath the exposure aperture 27, so that the exposure aperture 27 is cleared and the exposure of the film takes place. After the end of the pre-set exposure time the carrier levers 25 and 26 with the upper leaf group are rotated in the clockwise direction to close the exposure aperture 27.

We claim:

1. A focal-plane shutter for photographic cameras comprising:
   (a) a support plate,
   (b) first groups of shutter opening leaves having a main leaf and secondary leaves,
   (c) a second group of shutter closing leaves having a main leaf and secondary leaves, the main leaves serving to form between them an exposure aperture during a part of the shutter exposure movement,
   (d) a first pair of carrier levers movable in a plane parallel to the plane of the shutter,
   (e) a second pair of carrier levers also movable in a plane parallel to the plane of the shutter,
   (f) each carrier lever being pivotally mounted on said support plate on a first axis and pivotally mounted on the respective main leaf on a second axis, whereby the carrier levers form two parallelogram linkages with said support plate and main leaves,
   (g) said second pair of carrier levers having the same said first axis, and
   (h) pivot means for connecting the secondary leaves of each group to the respective carrier levers at positions intermediate said carrier levers first and second axes.

2. Focal-plane leaf shutter according to claim 1, wherein the exposure aperture has two short sides and two longer sides and said first pair of carrier levers arranged offset in relation to said second pair of carrier levers, the said first axes of each of said first carrier levers being at a shorter distance from a short side of the exposure aperture than the said first axis of said second pair of carrier levers.

3. Focal-plane leaf shutter according to claim 2, wherein the two leaf groups, each consist of a slot-forming main leaf and several covering secondary leaves, together with their carrier levers are arranged in rotational symmetry about an axis which proceeds perpendicularly of said short side of the exposure aperture approximately through the middle of the exposure aperture.

* * * * *